(12) United States Patent
Pathapati et al.

(10) Patent No.: US 11,082,445 B1
(45) Date of Patent: Aug. 3, 2021

(54) PREVENTING PHISHING ATTACKS VIA DOCUMENT SHARING

(71) Applicant: NetSkope, Inc., Santa Clara, CA (US)

(72) Inventors: Venkataswamy Pathapati, Andhra Pradesh (IN); Anupam Kumar, Bengaluru (IN); Prasenna Ravi, Thanjavur (IN); Muhammed Shafeek, Bangalore (IN)

(73) Assignee: NetSkope, Inc., Santa Clara, CA (US)

( * ) Notice: Subject to any disclaimer, the term of this patent is extended or adjusted under 35 U.S.C. 154(b) by 0 days.

(21) Appl. No.: 17/154,978

(22) Filed: Jan. 21, 2021

(51) Int. Cl.
*H04L 29/06* (2006.01)
*G06F 16/93* (2019.01)

(52) U.S. Cl.
CPC ............ *H04L 63/145* (2013.01); *G06F 16/93* (2019.01); *H04L 63/0236* (2013.01); *H04L 63/0281* (2013.01); *H04L 63/1425* (2013.01)

(58) Field of Classification Search
CPC ............... H04L 63/145; H04L 63/1425; H04L 63/0281; H04L 63/0236; G06F 16/93
See application file for complete search history.

(56) References Cited

U.S. PATENT DOCUMENTS

| | | | |
|---|---|---|---|
| 9,350,757 B1* | 5/2016 | Falkowitz | ............. H04L 69/161 |
| 9,413,774 B1* | 8/2016 | Liu | ...................... H04L 63/1416 |
| 2017/0116416 A1* | 4/2017 | Pearcy | ................... G06F 21/552 |
| 2018/0183820 A1* | 6/2018 | Iyer | ...................... H04L 63/1483 |
| 2020/0204572 A1* | 6/2020 | Jeyakumar | .............. H04L 51/12 |
| 2020/0351300 A1* | 11/2020 | Kaidi | ................... H04L 51/063 |

OTHER PUBLICATIONS

P. A. Legg, O. Buckley, M. Goldsmith and S. Creese, "Automated Insider Threat Detection System Using User and Role-Based Profile Assessment," in IEEE Systems Journal, vol. 11, No. 2, pp. 503-512, Jun. 2017, doi: 10.1109/JSYST.2015.2438442. (Year: 2017).*

(Continued)

*Primary Examiner* — Joseph P Hirl
*Assistant Examiner* — Ka Shan Choy
(74) *Attorney, Agent, or Firm* — Haynes Beffel & Wolfeld LLP; Ernest J. Beffel, Jr.

(57) ABSTRACT

The technology disclosed includes a system and method for preventing phishing attacks caused by sharing documents with malicious content over a network, where the shared document may include links that redirect users to a malicious websites. The cloud-based method applies a set of rules and policies to allow the shared document or block the shared document from the network, based on identifying the ownership or originator of the shared document. Blocked documents are quarantined, analyzed for threats, and subjected to sandbox methods to determine malicious content that may compromise corporate data. If analysis proves the blocked document to be safe, it may be released into the network along with subsequent documents having the same ownership or originator. The technology disclosed is particularly useful where a malicious attacker creates a malicious file in a cloud-based store such a Google Drive and shares it with endpoint users. When users open the shared document, they are redirected to a malicious website where a corporation's critical data may be compromised.

26 Claims, 10 Drawing Sheets

(56) References Cited

OTHER PUBLICATIONS

"Data Loss Prevention and Monitoring in the Cloud" by netSkope, Inc., Nov. 2014, 18 pgs.
"Netskope Active Cloud DLP," netSkope, Inc., 2015, 4 pgs.
"Repave the Cloud-Data Breach Collision Course," netSkope, Inc., 2014, 6 pgs.
"The 5 Steps to Cloud Confidence," netSkope, Inc., 2014, 11 pgs.
"Netskope Cloud Confidence Index™," netSkope, Inc., 2015, 2 pgs.
"Netskope Introspection," netSkope, Inc., 2015, 3 pgs.
"Cloud Data Loss Prevention Reference Architecture", Sep. 2015, Netskope, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope the 15 Critical CASB Use Cases", Netskope, Inc., EB-141-1, 19 pages.
Sergiu Gatlan, "Phishing Campaign Uses Google Drive to Bypass Email Gateways", Aug. 14, 2019, 3 pages (downloaded Aug. 27, 2020 from https://www.bleepingcomputer.com/news/security/phishing-campaign-uses-google-drive-to-bypass-email-gateways/).

* cited by examiner

PREVENTING PHISHING ATTACKS VIA DOCUMENT SHARING

FIELD OF THE TECHNOLOGY DISCLOSED

The technology disclosed relates generally to cloud-based security, and more specifically to a system and method for preventing phishing attacks caused by document sharing using a cloud-based store. The technology disclosed relates to a system and method for preventing a phishing technique wherein a malicious attacker creates a malicious file in a cloud-based store such a Google Drive and shares it with endpoint users. When the users open the shared document they are redirected to a malicious website where the user's data and corporate critical data may be compromised.

BACKGROUND

The subject matter discussed in this section should not be assumed to be prior art merely as a result of its mention in this section. Similarly, any problems or shortcomings mentioned in this section or associated with the subject matter provided as background should not be assumed to have been previously recognized in the prior art. The subject matter in this section merely represents different approaches, which in and of themselves can also correspond to implementations of the claimed technology.

Cloud services are becoming the preferred method for handling corporate computing because of its multiple advantages, such as the flexibility it provides for corporations and businesses. Unfortunately, there are increased risks associated with using cloud services, particularly in providing adequate security for sensitive company information. Financial information, human resources information, marketing information, intellectual property, and technical product development information, when stored in cloud-based storage systems, can be compromised or stolen, unless adequate security systems and processes are provided to protect that information. Sensitive company data is being uploaded, downloaded, copied, and shared on a daily basis, where it is vulnerable to phishing attacks.

The term "phishing" refers to a number of methods to fraudulently acquire sensitive information over the web from unsuspecting users. Phishing arises, in part, from the use of increasingly sophisticated lures to "fish" for a company's confidential information. These methods are generally referred to as "phishing attacks."

In cloud computing, involving cloud-based storage platforms, one form of a phishing attack involves sharing documents into a cloud-based storage platform. A phishing attacker, masquerading as a trustworthy website, shares a document within a corporate network. Network users, accessing the shared document, are enticed into opening the document. The shared document will provide links to redirect the user to a malicious website, where sensitive data can be compromised or stolen. Because the shared "malicious" document is accessible by everyone on the corporate network, the damage to corporate organizations can be extreme.

The proliferation of off-premises storage platforms has further exposed enterprise data to compromise. Organizations typically sanction one or two selected cloud-based storage platforms. Beyond sponsored accounts, organizations may have dozens of additional storage platforms in use by employees. Some of these are social media sites such as Twitter and LinkedIn. Others are file sharing services, such as Google Drive, Box, and Dropbox. Although most large organizations monitor sanctioned services, users may use unsanctioned cloud services that pose a more serious threat to network security since they can "fly below the radar" of corporate cloud-security systems. Unsanctioned cloud services are known as Shadow IT.

Increasingly, documents reach an organization via sharing or links. A shared document can be copied into an account or it can be made accessible via a link set up on the cloud-based storage platform. Links are efficient because one copy serves many users. Users update the same document. Concurrent updating is managed by the storage platform itself. Documents shared by a cloud-based storage platform are more difficult to inspect than attachments to email. A document sharing link does not include document content. Systems that inspect content attached to emails, for instance, are incapable of inspecting documents referenced by links.

Thus, there is a need for an improved system and method for providing security against phishing attacks, particularly caused by sharing or linking documents from cloud-based storage platforms. Implementations of the present invention seek to prevent these phishing attacks.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

The technology disclosed addresses phishing attacks via shared documents from cloud-based storage platforms. Off-premises storage platforms have proliferated in recent years. Organizations typically sponsor one or two selected cloud-based storage platforms. Beyond sponsored accounts, organizations may have dozens of additional storage platforms in use by employees.

Documents increasingly reach an organization via sharing or links. A shared document can be copied into an account or it can be made accessible via a link set up on the cloud-based storage platform. Links are efficient because one copy serves many users. Users update the same document. Concurrent updating is managed by the platform.

Documents shared by cloud-based storage platforms are more difficult to inspect than attachments to emails. A document-sharing link does not include document content. Systems that inspect content attached to emails, for instance, are incapable of inspecting documents referenced by links. The phishing risk can be greater for shared documents than for emails, because users may be lulled into trusting documents that have reached their sponsored account in cloud-based storage.

The technology disclosed implements organization policies to mitigate the risk posed by documents shared via cloud-based storage platforms and, particularly, phishing risk. It is useful to ascertain the source of shared documents in a cloud storage device and in a rapid manner. The present technology uses network policies-enforced rules to determine document ownership.

Document ownership is the key to tracking the origin of a document instance from cloud-based platform metadata. There are certain times when metadata is exposed within network traffic, and this provides an effective means of determining document ownership. It also provides the solution for dealing with a phishing threat to a corporate network or corporate device. Other methods involve querying the source.

Accordingly, Document files which may include malicious links are identified, quarantined, and inspected for threats utilizing known techniques, including secure sandboxing.

An in-line proxy, positioned between the user and the cloud-based storage platform, is a key element in providing a system to inspect, quarantine, and sandbox potentially malicious links before the shared document becomes available on the organization network. The system's proxy can be configured to access content corresponding to embedded links, sandbox the content, and inspect/explore the embedded links to make sure that shared documents are safe, before allowing users to access the shared documents through the proxy.

Determining the Ownership of a Shared Link

Identification of the owner of a shared link requires the examination of metadata in network traffic. Sometimes, the owner is identified in metadata that accompanies a shared link. Other times, a separate administrative call needs to be made from the proxy to the cloud-based storage platform to obtain ownership information.

The technology disclosed determines ownership of a shared or linked document and uses ownership to apply control policies. This is a highly-efficient method. Other approaches are relatively expensive and inconvenient, such as inspecting large documents for numerous links and to navigate all links in a document. For instance, a captured webpage in a PDF document will include dozens of direct and indirect links.

Some sources of documents may be considered reliable and may be subjected to reduced screening or may be readily accepted once screening has been conducted. In contrast, blacklisted owners of documents may not be eligible for sharing of documents into the organization no matter what screening is conducted. In between the two extremes, some sources of documents may be accepted only after full screening and may even require comment by the receiver, despite the resulting inconvenience. Accordingly, ownership can usefully be part of policy specifications and implementation.

The technology disclosed is designed to automatically obtain content, then inspect and explore, using a secure sandbox, links in shared documents from most external sources. The system's proxy can be configured to access content corresponding to embedded links, sandbox the content, and inspect/explore embedded links to make sure that shared documents are safe, before allowing users to access shared documents through the proxy.

System Overview

Figure 1:
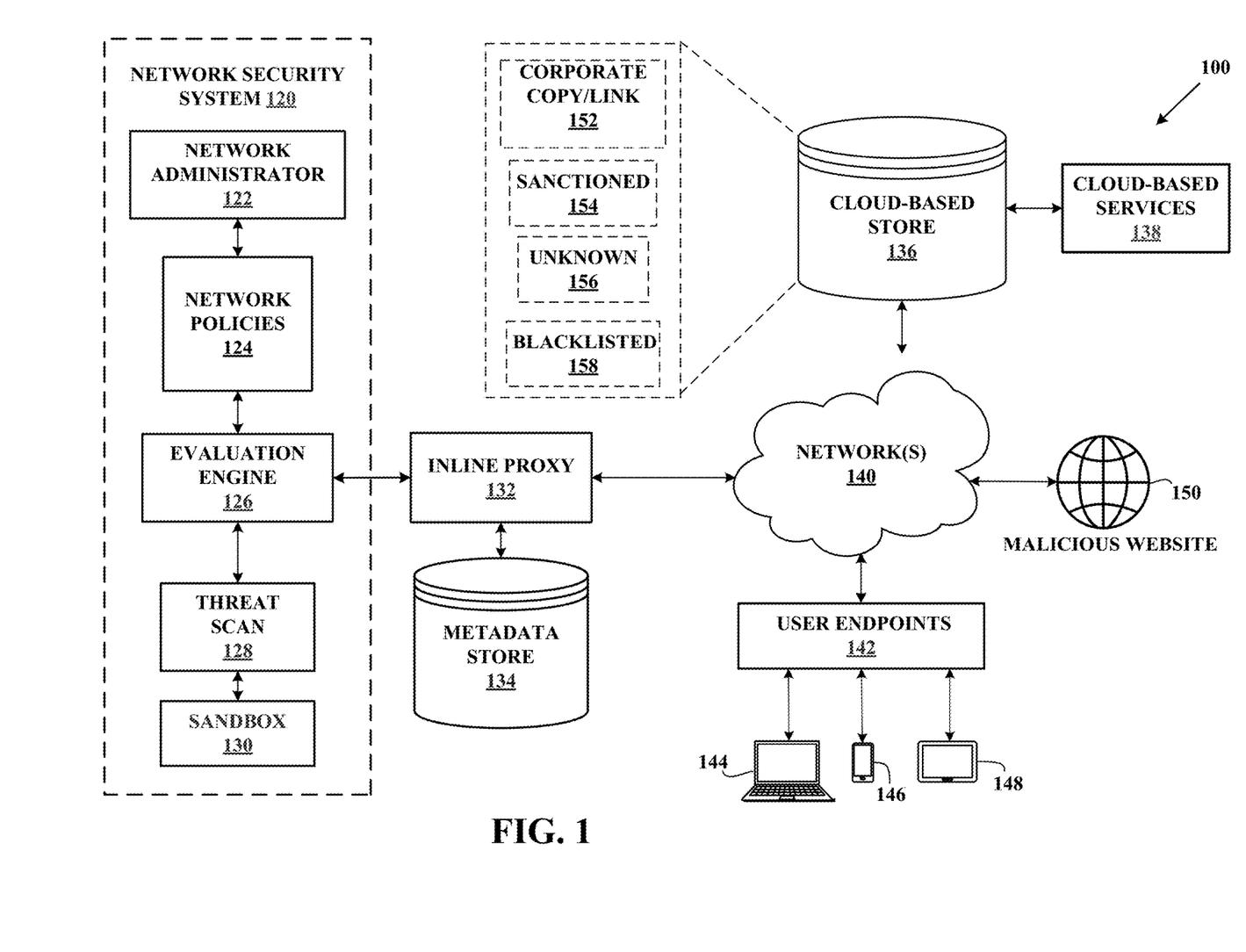
FIG. 1 illustrates an architectural level schematic of a system for preventing phishing attacks caused by document sharing and linking from cloud-based storage platforms.

The following describes in architectural form a system and various implementations for preventing phishing attacks in a cloud-based system including an off-site cloud-based store. An architectural diagram of the system 100 is shown in FIG. 1, which is intentionally simplified to improve clarity in the description. FIG. 1 shows the interconnection of the various major elements. The use of these elements will be described in greater detail further on in connection with the discussion of the particular structure and use of those elements.

FIG. 1 includes the system 100 including the endpoints 142. User endpoints 142 may include devices such as computers 144, smart phones 146, and computer tablets 148, which provide access and interact with data stored on a cloud-based store 136 and cloud-based services 138. An inline proxy 132 is interposed between the user endpoints 142 and the cloud-based services 138 through the network 140 and particularly through a network security system including a network administrator 122, network policies 124, an evaluation engine 126, a threat scan subsystem 128, and a sandbox 130, and a metadata store 134, which will be described in more detail. The In-line proxy 132 may be accessible through the network 140, or it may be resident as part of the network security system 120. The in-line proxy 132 provides traffic monitoring and control between the user endpoints 142, the cloud-based store 136 and other cloud-based services 138.

The in-line proxy 132 monitors the network traffic between user endpoints 142 and cloud-based services 138, particularly to enforce network security policies including data loss prevention (DLP) policies and protocols.

The interconnection of the elements of system 100 will now be described. The network 140 couples the computers 144, smart phones 146, and the computer tablets 148 and metadata store 134 and in the in-line proxy 132 with each other. The communication path can be point-to-point over public and/or private networks. The communication can occur over a variety of networks, including private networks, VPN, MPLS circuit, or Internet, and can use appropriate application programming interfaces (APIs) and data interchange formats such as Representational State Transfer (REST), JavaScript Object Notation (JSON), Extensible Markup Language (XML), Simple Object Access Protocol (SOAP), Java Message Service (JMS), and/or Java Platform Module System.

All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX.

The engines or system components of FIG. 1 are implemented by software running on varying types of computing devices. For example, a workstation, server, a computer cluster, a blade server, or a server farm. Additionally, a variety of authorization and authentication techniques, such as username/password, Open Authorization (OAuth), Kerberos, SecureID, digital certificates and more, can be used to secure the communications.

The cloud-based services 138 provide functionality to users that is implemented in the cloud or on the Internet. The cloud-based services 138 can include Internet hosted services such as news web sites, blogs, video streaming web sites, social media web sites, hosted services, cloud applications, cloud stores, cloud collaboration and messaging platforms, and/or cloud customer relationship management (CRM) platforms. Cloud-based services 138 can be accessed using a browser (via a URL) or a native application (a sync client).

Categories of cloud-based services 138 include software-as-a-service (SaaS) offerings, platform-as-a-service (PaaS) offerings, and infrastructure-as-a-service (IaaS) offerings.

Examples of common web services today include YouTube™, Facebook™ Twitter™, Google™, LinkedIn™, Wikipedia™, Yahoo™, Baidu™, Amazon™, MSN™ Pinterest™ Taobao™, Instagram™, Tumblr™, eBay™, Hotmail™, Reddit™ IMDb™, Netflix™ PayPal™ Imgur™ Snapchat™, Yammer™, Skype™, Slack™, HipChat™ Confluence™, TeamDrive™, Taskworld™, Chatter™, Zoho™, ProsperWorks™, Google's Gmail™, Salesforce.com™, Box™, Dropbox™, Google Apps™, Amazon AWS™, Microsoft Office 365™, Workday™, Oracle on Demand™, Taleo™, Jive™, and Concur™.

Users belonging to a corporate organization access hundreds of providers of cloud-based services to generate, store, collaborate, and share data with other users inside or outside of the organization. This can invite phishing attacks. The cloud-based services 138 provide functionality to the users of the organization that is implementing security policies. When a user sends a request to a cloud-based service via an endpoint 142, the inline proxy 132 intercepts the request message. The inline proxy 132, by accessing a database, seeks to identify the cloud-based service 138 being accessed. In one implementation, according to the present invention, The inline proxy accumulates the metadata in request messages from the user to the metadata store 134 to identify cloud based services 138 being accessed. When a document instance is shared or linked between a cloud-based store 136 and user endpoints 142 through the network, there is a danger of phishing attacks. Corporate devices (also referred to as corporate network devices in the following discussion) in the form of mobile devices such as smart phones, often times operate outside the network. Corporate data stored in mobile devices can be easily compromised. Employees of an enterprise often use their own mobile devices to carry out day-to-day enterprise tasks from remote locations. In doing this, they tend to collect, share, and access crucial organizational data and information. This practice cannot be easily avoided if the employees of the enterprise are to stay productive, operating seamlessly. Unfortunately, by using this process, these employees unknowingly make critical enterprise data stored in these personal devices vulnerable to loss or misuse.

The Network Security System

Corporate internal documents 152 documents and links can generally be distributed, copied or linked within a corporation, with minimal concern. Document instances from cloud storage, originating outside of the corporate network are generally classified by threat level. The first category includes a document instance originating from a trustworthy sites such as Cisco, Juniper, Netskope, etc. These are sanctioned sites 154, which present high confidence of being safe and not associated with phishing attacks. Documents sharing a link from trustworthy sites require only minimal analysis.

The next category is document instances originating from an unknown 156 source. Documents from an unknown 156 source will be blocked and undergo in-depth evaluation and analysis before they are allowed to enter the corporate network. The analysis will require ownership identification using the methods described further on. In many cases, if the ownership cannot be determined with reasonable confidence, the document will undergo an in-depth threat scan 128, which may also include isolation in the sandbox 130, where any embedded code is run in an isolated environment to determine if any embedded links cause direction to a malicious website. Only if the analysis is successfully completed will the document allowed to be shared inside the corporate network or with any corporate devices.

The final category is documents originating from known malicious websites 150. These are websites and URLs that have been associated with phishing attacks in the past or in any other way compromise network security. The metadata store 134 tracks, stores, and maintains in a database all known blacklisted 158 sites. The evaluation engine 126 checks the database record of these blacklisted 158 URLs. Documents being shared or linked from any of these phishing URLs are automatically and permanently blocked. According to some embodiments, the present technology is directed to a method of detecting and discarding blacklisted URLs that are known to include malicious objects and links. In the case of blacklisted URLs, a deep threat scan is not necessary, which reduces him latency and improves data throughput efficiency.

In one implementation, the requirement is to identify a user who has shared file attachments via Gmail, Google Drive, Google Docs/Sheets/Slides/Sites. First, the system 100 must determine whether the user sharing a document is located within the corporate network or outside the corporate network. Network policies 124 can be implemented to block files being shared, which originate from outside the corporate network. FIG. 4 through FIG. 10 illustrates the code associated with determining the ownership of an unidentified document file.

Google provides different ways to access accounts. Users can log into different accounts in different browser tabs (personal accounts in one browser tab and corporate account in another browser tab and incognito). Users can also create different chrome profiles that are supported for a chrome browser. Each chrome profile can have different accounts. The system 100 extracts two important parameters from the traffic (auth_id, SID) to differentiate the accounts and identify the correct "from user" and instance details for all the possible access ways. If the user uses any of the above-mentioned access methods, the system can identify the "from user" and instance details.

Google Chrome Profile Support

When the user gets any attachment (Google Drive file, Docs, Sheets, etc.) via email and opens the file from his login account (corporate), the opened file will have the already login user-session information like auth_id and SID (cookies). Therefore, with the current approach, this file will be identified as already login user.

For example, a user logs onto Gmail with an ID "abc@kkrlog.com" and gets a document from the external user "xyz@gmail.com". When the user opens the file, it will show that "abc@kkrlog.com" is the user performing the activity and the instance of the file is "kkrlog.com" but "gmail.com" is the actual instance of the file.

Policies Regarding Attachments

Generally, there are two fundamental policies for users regarding file attachments. One policy is "allowed corporate instance" and the other policy is "blocking personal instance." Even though the owner of a shared file is an external user, the instance of the file is considered corporate, so that the first policy "allowed corporate instance" will activate, allowing the user to perform activities on externally shared files. In the present discussion, a corporate instance is defined as a company-sanctioned instance of a cloud application.

The system needs to identify the owner of the created file. In order to identify the author of the file while viewing, external files will not be allowed to access the corporate network or perform any activity. Therefore, phishing attackers cannot steal the corporate information with this technique.

Traffic Analysis for Viewing Google Drive/Docs/Sheets/Slides File

When a user gets a document from either Google Drive, Sheets, Documents, Slides, etc. via Email or shared a link, the user will generally open it. When the user opens it, the response transaction data has the Owner of the file that means it can be Gmail (gmail.com) or specific instance. If the document is created by the personal account, the pattern will be empty ("docs-dodn":" "); and if the document is created with other then Gmail instance, the pattern will be ("docs-dodn":"bigbira", "docs-dodn":"kkrlog", "docs-dodn":"netskope").

If the docs-dodn is empty, it can be assumed that document is created by Gmail (personal) and the instance will be gmail.com. If the pattern is present in docs-dodn, then it can be considered as an instance. For any document which is created by a personal account (venkat@gmail.com, venkat123@gmail.com, etc.) the instance will be "gmail.com". For a document created with any specific instance (venkat@kkrlog.com), the instance will be "kkrlog.com". The above extraction of the instance helps users to block the personally created documents viewing by the corporate users, and allow only corporate documents. But this will block the customers who are accessing personally created documents from their personal instance.

The system will extract the instance for file view activity and populate the instance as the owner of the file. For other activities on the same file (download/edit), the owner of the file is not known in the traffic but the file_id is unique at least across the instance. There is, at least, a unique opaque ID for each file. File IDs are stable throughout the life of the file, even if the file name changes. Mapping the file_id vs instance for other activities is required.

Google Document Traffic for Gmail Instance (Personal)

What is the instance when users view documents from Google Drive, Docs, Sheets etc. When the users log in to their Google Drive, Docs, Sheets account (personal or corporate) and views any document, then the response data has the instance details. Therefore, if a user logs in to a personal account, then the instance will be gmail.com, and if the user logs in with a corporate account, then the instance will be a corporate instance. This behavior is the same as described above.

Process Flow

Figure 3:
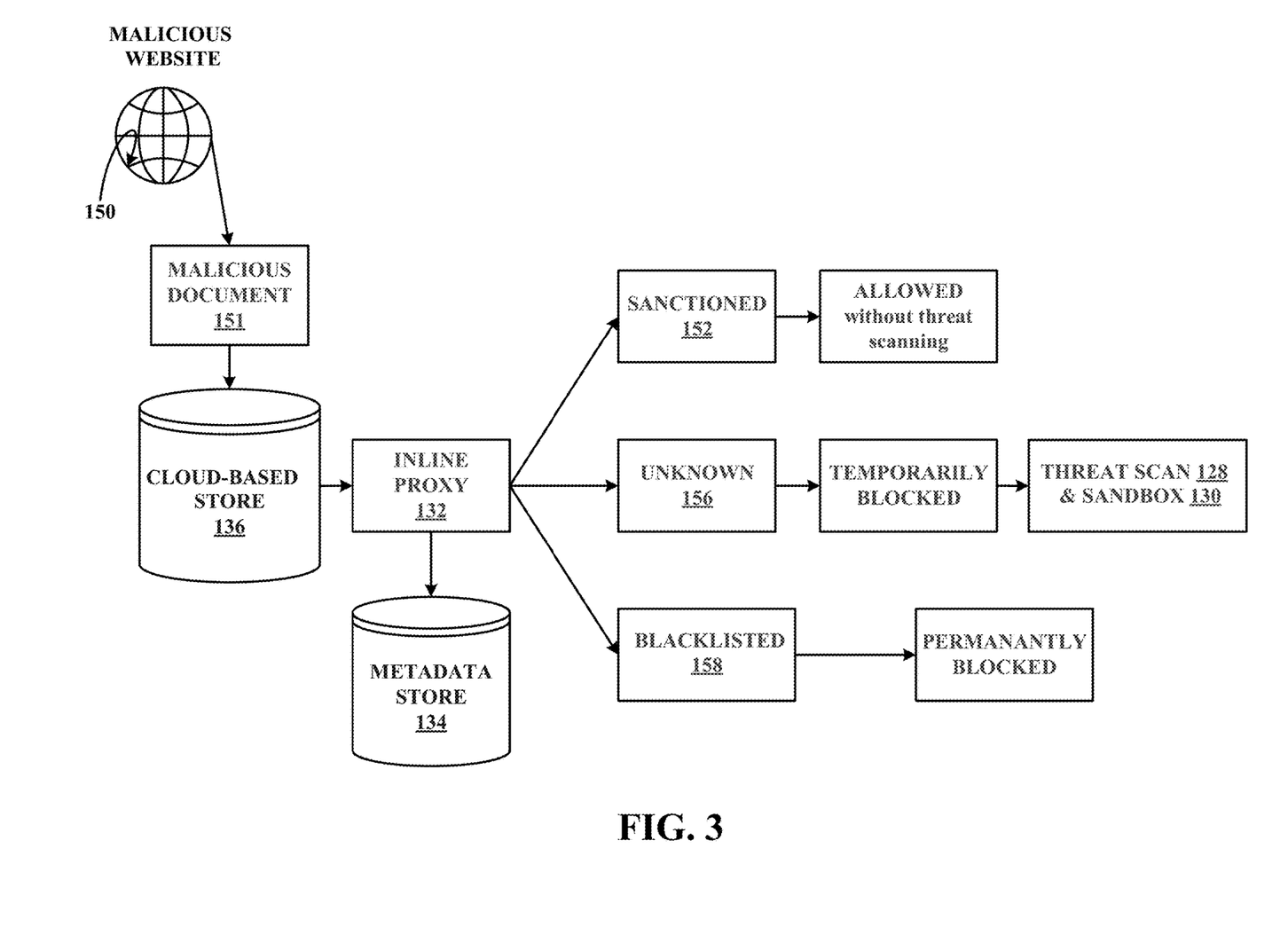
FIG. 3 illustrates the process flow for evaluating document files shared in the corporate network.
Figure 4:
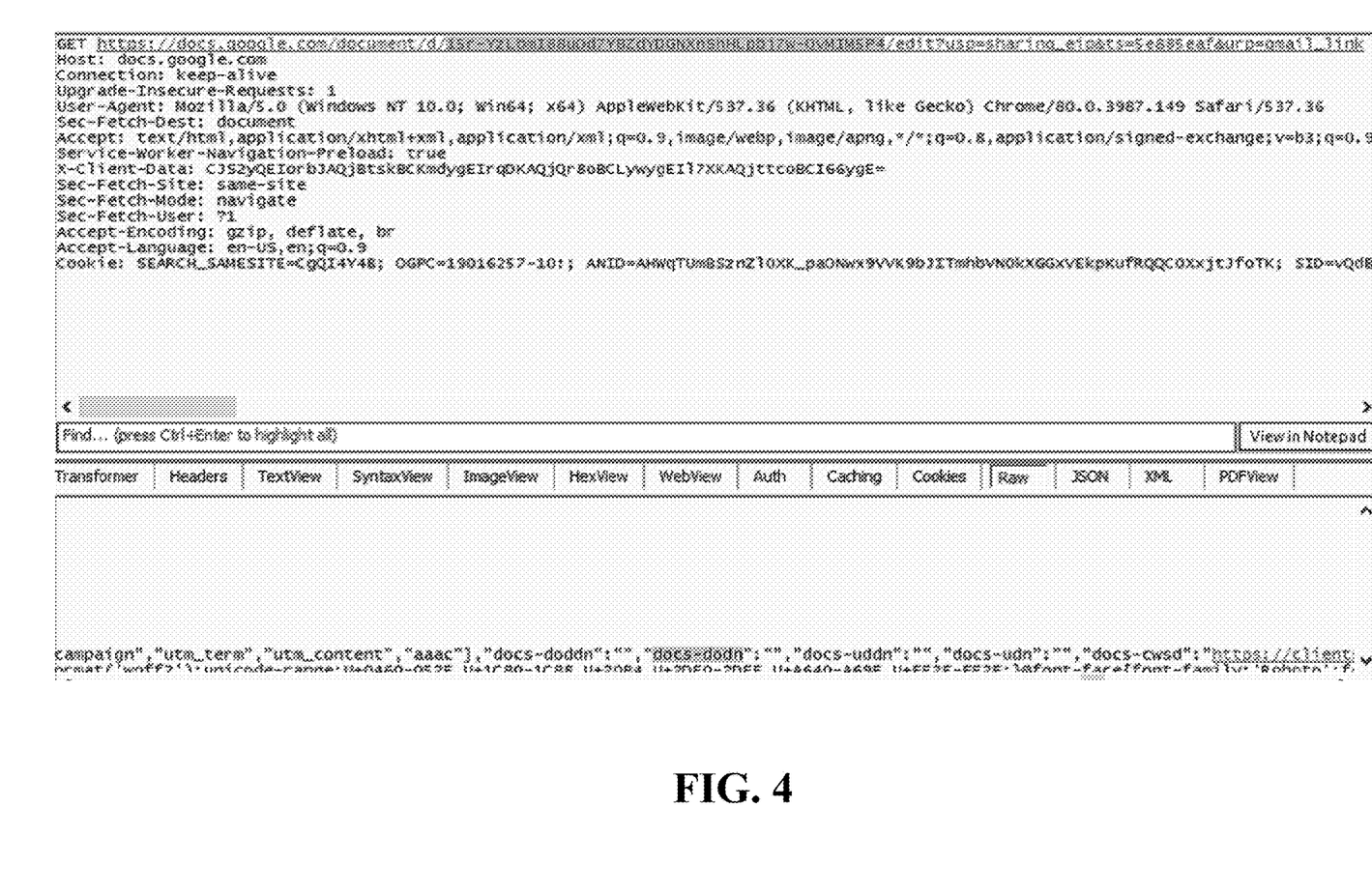
FIG. 4 illustrates Google Document Traffic for Gmail personal instance.
Figure 5:
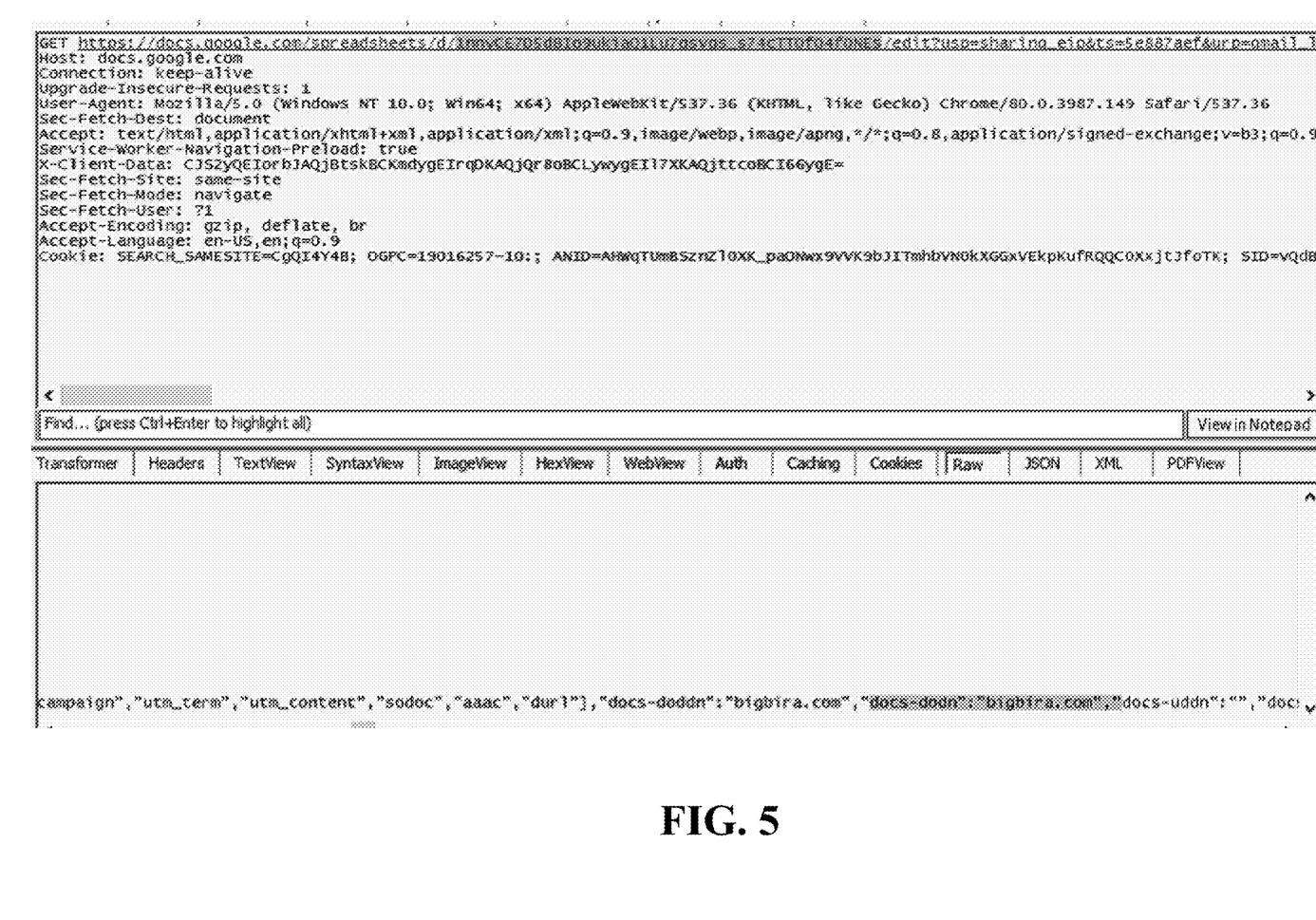
FIG. 5 illustrates Google Document Traffic for a corporate instance.
Figure 6:
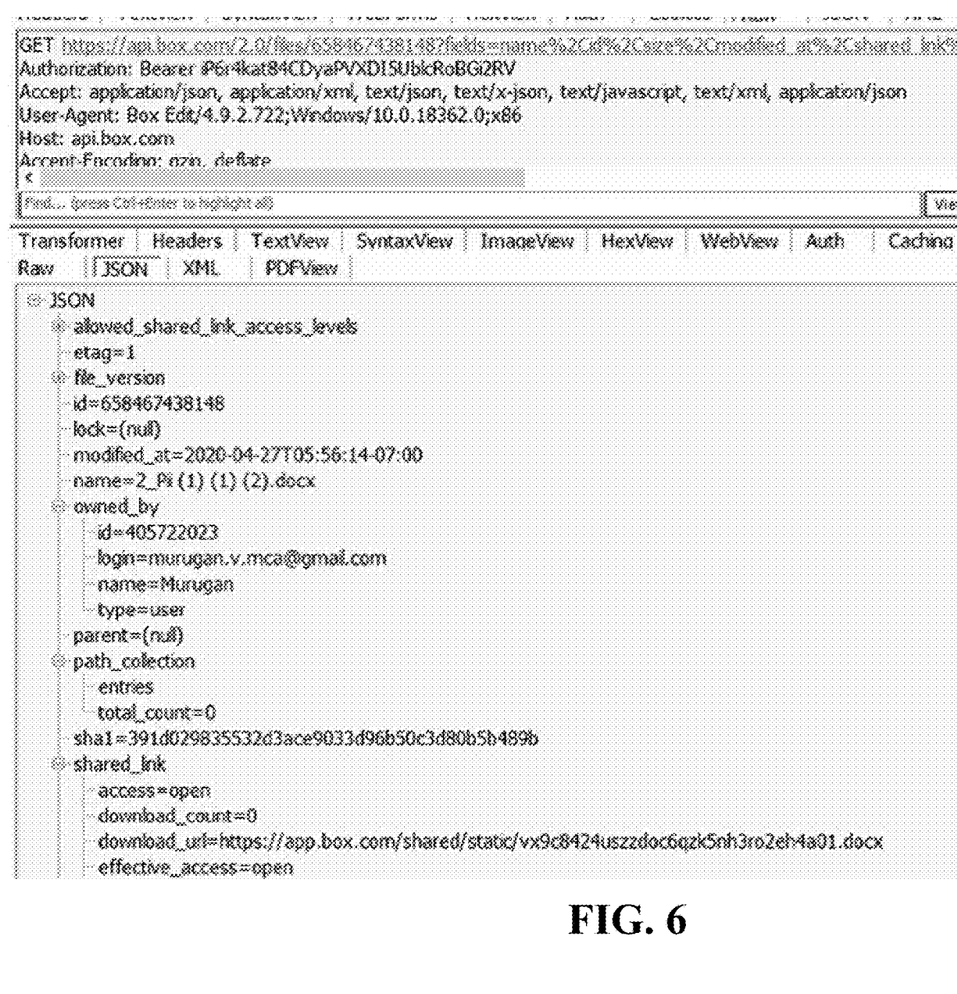
FIG. 6 illustrates traffic analysis for Box application (corporate and personal).
Figure 7:
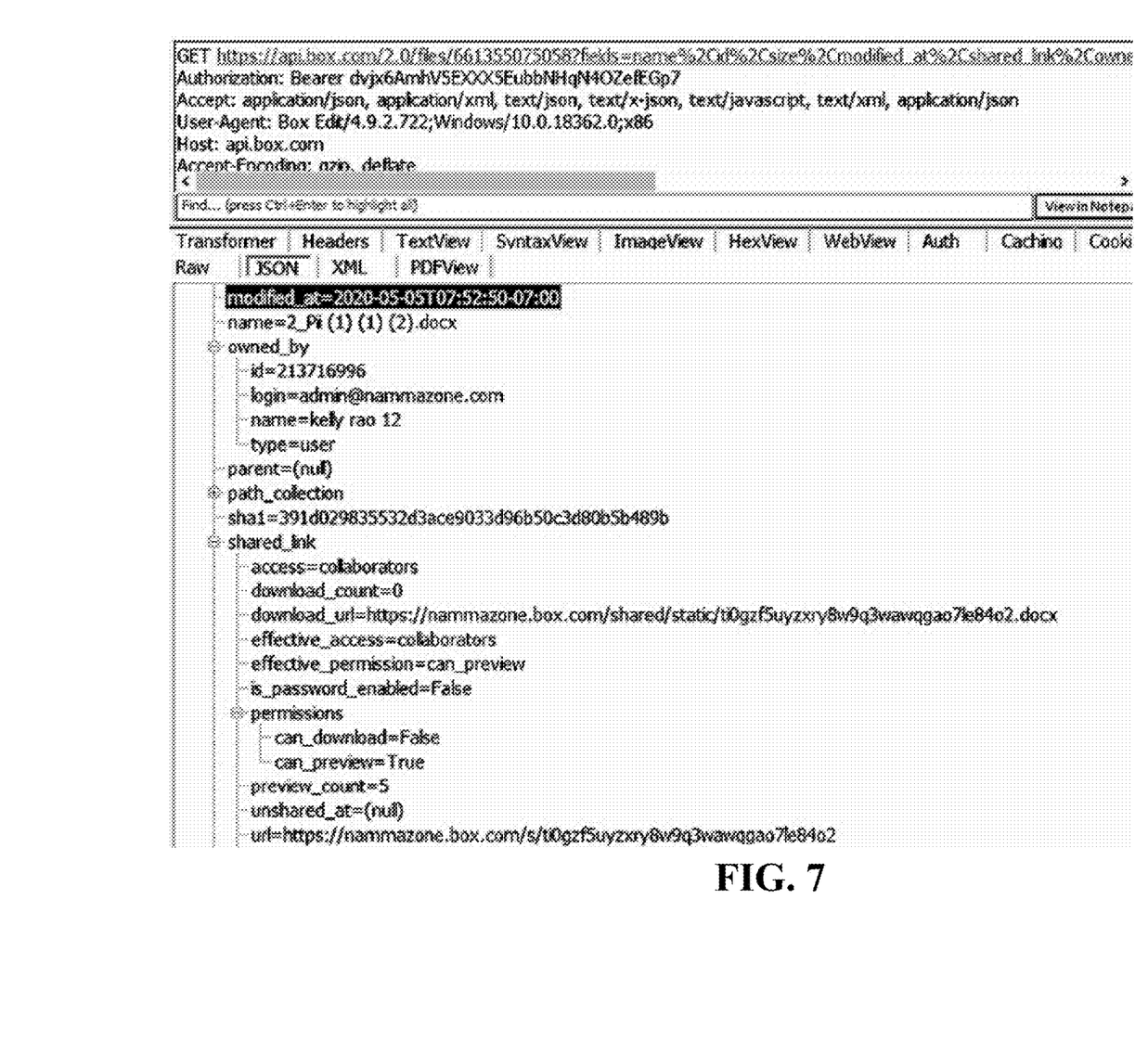
FIG. 7 illustrates a meta transaction where user a logs on to a corporate account and downloads a file created by the login user.
Figure 8:
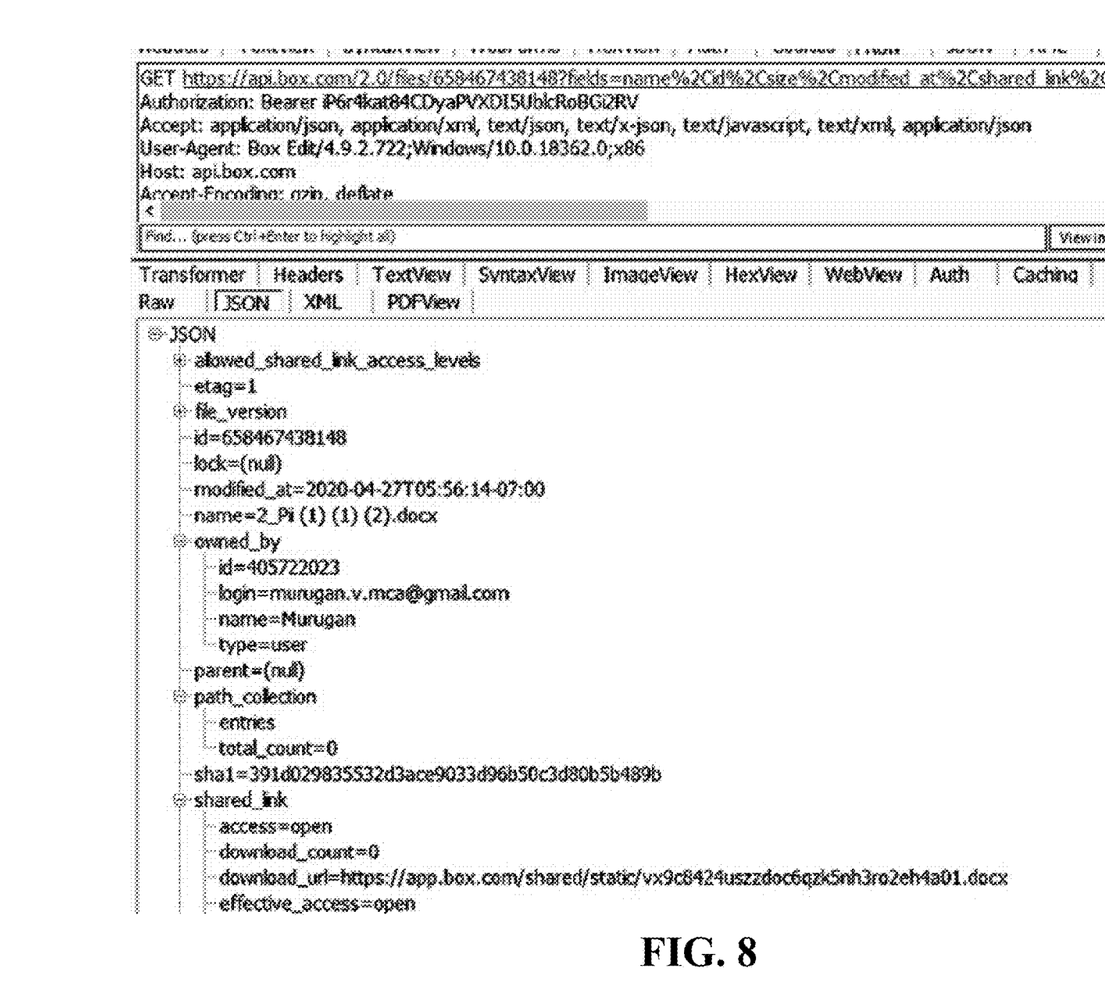
FIG. 8 illustrates a meta transaction where a corporate user downloads the file that is shared by the corporate instance.
Figure 9:
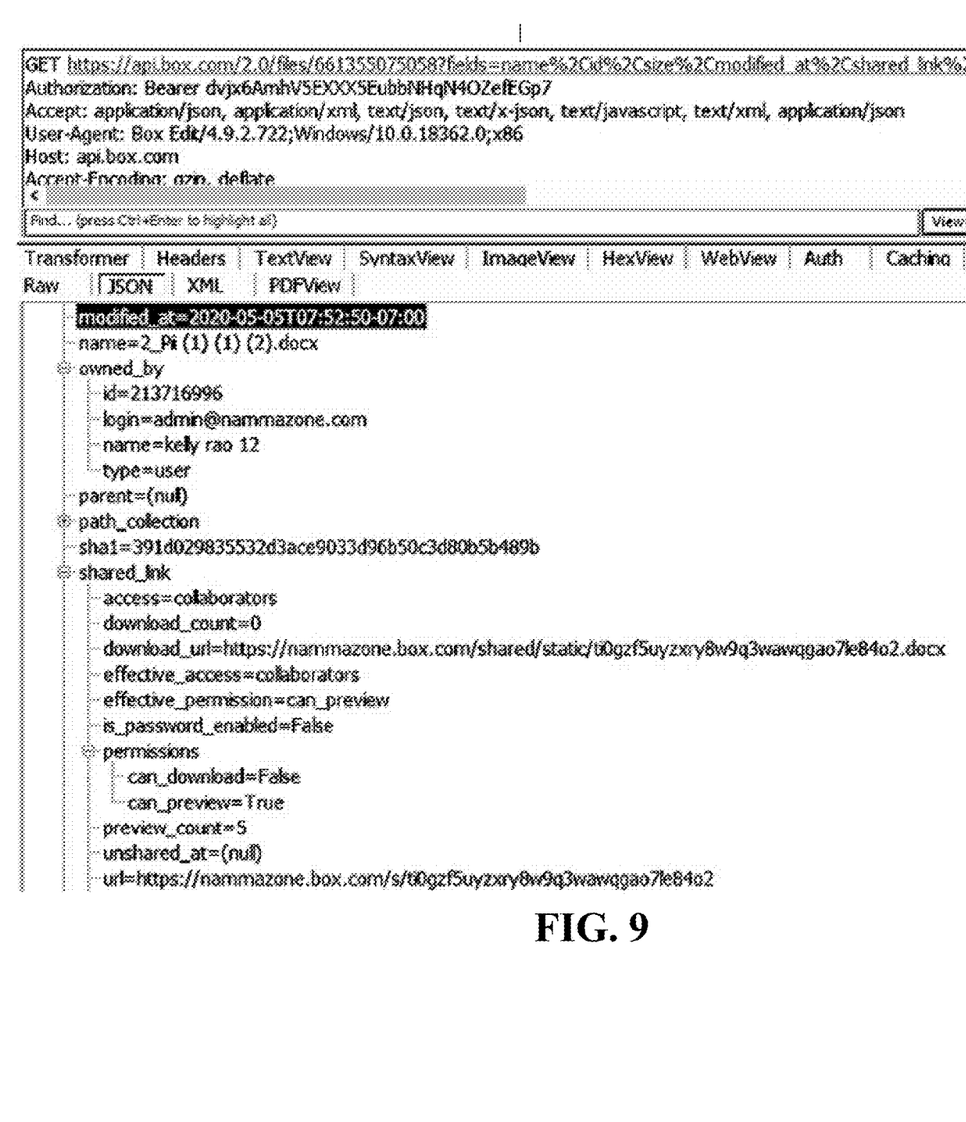
FIG. 9 illustrates a meta transaction where the user logs into a corporate account and views and downloads a file that is shared by a personal account.
Figure 10:
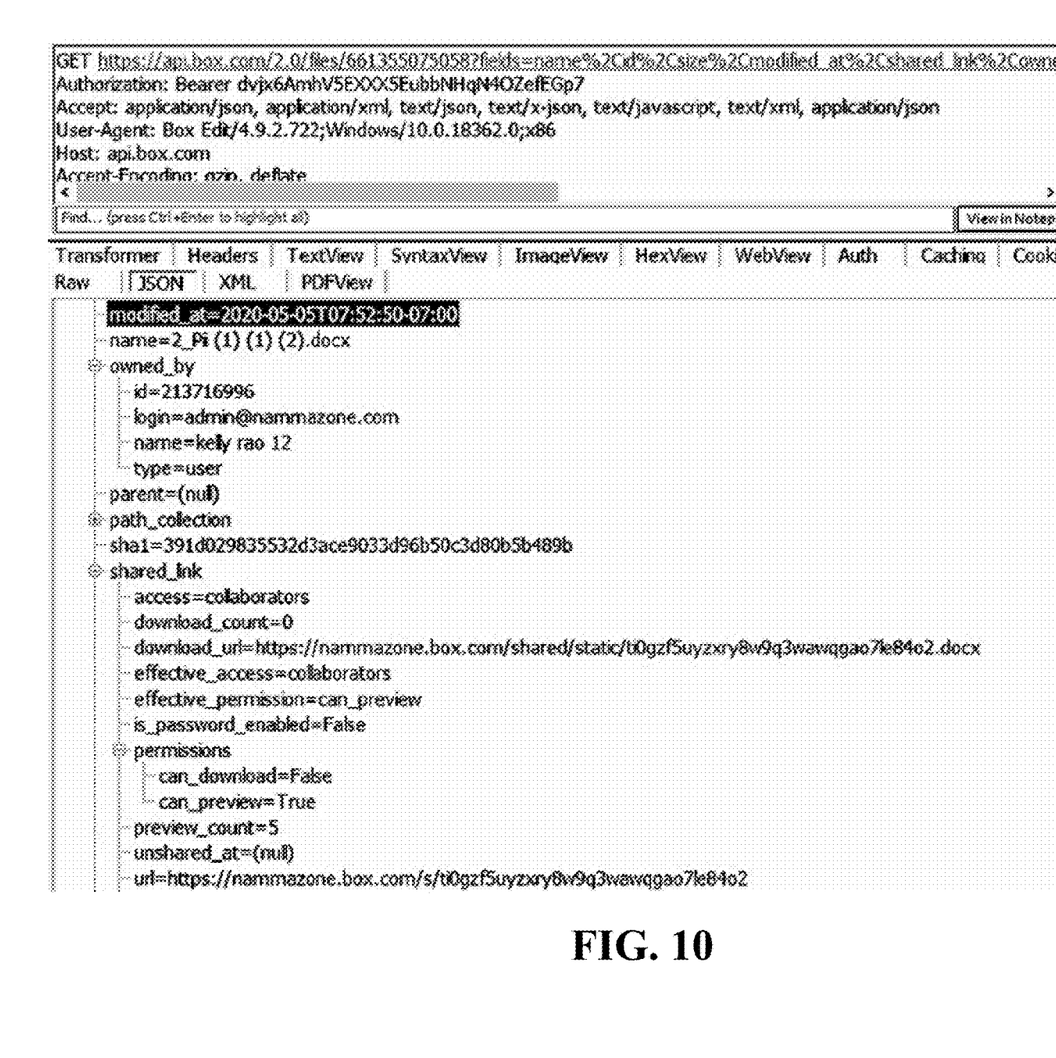
FIG. 10 illustrates a meta transaction where user logs into a corporate instance and views and downloads a file that is shared by the corporate instance.

FIG. 3 illustrates the process flow for evaluating document files shared in the corporate network. A malicious document 151, emanating from a malicious website 150 is shared into a cloud-based store 136 which is accessible to a corporate network. The rationale of a malicious attacker would be to make the malicious document enticing, so that it would be accessed by multiple users in a corporate network or using remote corporate devices. The inline proxy 132, which is part of the network security system 120 acts as an intermediary between the cloud and the corporate network controlling files that come from outside the corporate network.

Document files, attempting to enter the corporate will be identified by the methods described above and other metadata which identifies the document file origin. The metadata is stored in a metadata store 134 accessible by the inline proxy. Internal corporate documents are always sanctioned. Documents originating outside the corporate network, if sanctioned 152, are always allowed into the corporate network without threat scanning. These are documents from known sources, including large organizations and organizations which have a previous history with the corporate network. An example would be documents received from a corporate or client website such as Cisco, Netskope, or Juniper. It is assumed that malicious documents 151 received from sanctioned websites 152 are rare or virtually nonexistent. The metadata store 134 includes a listing of all websites and URLs which are sanctioned by the corporate network.

Document files received from known malicious websites 150 by the inline proxy as blacklisted 158 sites. As stated earlier, these are websites and URLs that have been associated with phishing attacks in the past or in any other way compromises network security. The metadata store 134 tracks, stores, and maintains in a database all known blacklisted 158 sites. Documents received in this category are automatically and permanently blocked. The present technology is directed to a method of detecting and discarding blacklisted URLs that are known to include malicious objects or links. In the case of blacklisted URLs, a deep threat scan is not necessary, which reduces him latency and improves data throughput efficiency.

Unknown documents 156 are evaluated as to their ownership and other metadata properties, which will identify the source of the unknown 156 document. If a document cannot be identified as to its source, it is temporarily blocked from entering the corporate network. This involves policy-based rules including matching techniques. The document is quarantined, and initially threat scanned 128. Much of this work requires the involvement of a network security administrator 122. If it is a certainty that malicious code may be involved, the document will enter the sandbox 130.

Sandbox Methods

In cybersecurity, computer security, sandboxing is a method of quarantining and testing unverified programs that may contain malicious code without allowing the software to harm the host device. A sandbox 130 is a software environment used for opening files or running programs without interfering or affecting the device they're on. Sandboxing is used to test code or applications that could be malicious before serving it up to devices. Malicious applications, links, and downloads could potentially gain endless access to a network's data if they are not first tested by sandbox software. Cloud sandboxing provides an additional layer of security to analyze threats and separate them from the network. Network and web security are important layers in a company's overall cybersecurity strategy to ensure online threats don't compromise operations.

Sandboxing can also be used as a tool to detect similar malware attacks and block them before they enter a network. The system allows the network security administrator 122 to test code and understand exactly how it works before it invades an endpoint device 142 with malicious code. It also provides insights about what to look for in alternative or future scenarios.

Potentially malicious code is allowed to run in the software environment separate from the corporate network, to prevent the situation where the code could "invade" with considerable damage.

Computer System

Figure 2:
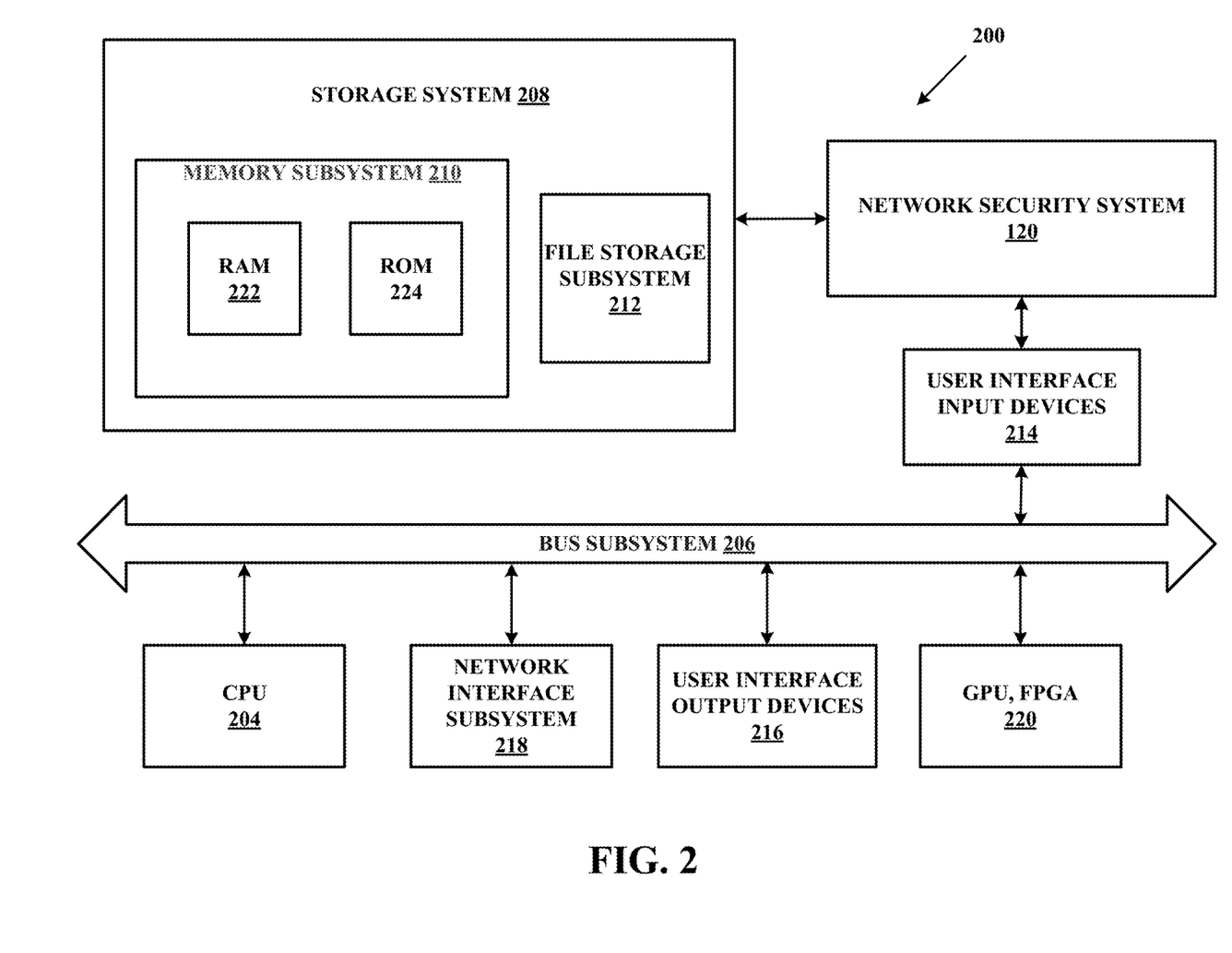
FIG. 2 is a simplified block diagram of a computer system that can be used for providing network security in the cloud-based network for delivering cloud-based services to end users.

Turning now to FIG. 2, a simplified block diagram of a computer system 200 is shown that can be used for providing network security in the cloud-based network delivering cloud-based services. Computer system 200 includes at least one central processing unit (CPU) 204 that communicates with a number of peripheral devices via bus subsystem 206, and network security system 120 for providing network security services described herein. These peripheral devices can include a storage subsystem 208 including, for example, memory devices 210 and a file storage subsystem 212, user interface input devices 214, user interface output devices 216, and a network interface subsystem 218. The input and output devices allow user interaction with computer system 200. Network interface subsystem 208 provides an interface to outside networks, including an interface to corresponding interface devices in other computer systems.

In one implementation, network security system 120 of FIG. 1 is communicably linked to the storage subsystem 208 and the user interface input devices 214. User interface input devices 214 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 200.

User interface output devices 216 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 200 to the user or to another machine or computer system.

Storage subsystem 208 stores programming and data constructs that provide the functionality of some or all of the modules and methods described herein. Additional subsystems 220 can be graphics processing units (GPUs) or field-programmable gate arrays (FPGAs).

Memory subsystem 210 used in the storage subsystem 208 can include a number of memories including a main random access memory (RAM) 222 for storage of instructions and data during program execution and a read only memory (ROM) 224 in which fixed instructions are stored. The file storage subsystem 212 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 212 in the storage subsystem 208, or in other machines accessible by the processor 204.

Bus subsystem 206 provides a mechanism for letting the various components and subsystems of computer system 200 communicate with each other as intended. Although bus subsystem 206 is shown schematically as a single bus, alternative implementations of the bus subsystem can use multiple busses.

Computer system 200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 200 depicted in FIG. 2 is intended only as a specific example for purposes of illustrating the preferred embodiments of the present invention. Many other configurations of computer system 200 are possible having more or less components than the computer system 200 depicted in FIG. 2.

Particular Implementations

The technology disclosed relates to a system and method for preventing phishing attacks caused by sharing documents with malicious content over a network, where the shared document may include links that redirect users to malicious websites. In one particular implementation, a cloud-based method applies a set of rules and policies to allow a linked document file into a corporate network or restrict the document file from entering the network, based on identifying the ownership or originator of the shared document.

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections. These recitations are hereby incorporated forward by reference into each of the following implementations.

One of the phishing methods increasingly used in cloud-based applications is the sharing of malicious linked document files via Google Drive. A phishing attacker will create a malicious file in Google Drive and share it with other users. If the end user opens the shared document, it will redirect the user to a malicious site where the end-user will get compromised. This phishing attack is aimed at corporate users with the goal of compromising sensitive corporate data, such as financials, strategic plans, intellectual property, customer lists, or personally identifiable information belonging to customers or employees, and the like.

In one implementation of the present technology, a solution is provided to identify the user who has shared a linked document file using cloud storage applications like Google Drive, Google Docs/Sheets/Slides, Box, Dropbox, One Drive, etc. The linked document file is identified as a corporate document internal to the corporate network or the document file is identified as originating outside the corporate network. The object is to identify the user who shared the linked document. A network security system for the corporate network provides an in-line policy to restrict access of unidentified shared document files.

In one implementation, a method is provided for mitigating phishing attacks against the corporate network via sharing of linked document files from cloud-based applications accessible from the corporate network. A link to a document file may include malicious links to malicious content. In the method claimed, it is initially assumed that any linked document file may include malicious content, so that the claimed method is applied repeatedly to multiple documents.

Document Traffic may include linked document files stored external to the corporate network, passing into the corporate network through an inline proxy. The inline proxy is responsive to an API access to accept sharing or to access linked documents via a cloud-based application accessible to the corporate network. The in-line proxy intercepts document files coming into the network and initially determines if the linked document is coming from inside or outside the corporate network. Document files determined to be within the corporate network are allowed access. These include document files originating from corporate devices located remotely from corporate network. All other document files are initially restricted before entering the corporate network. These documents require further processing.

As part of this particular implementation, the network includes policies that determine how any restricted document is handled by the network security system, based in part on the identification or ownership of the originator. Document traffic often provides indicators of the origin of a linked document. In cases where document traffic is not determinative of ownership, other methods are useful, such as querying the source of the document.

Some documents will be determined to be sanctioned documents, which originate from trusted sources. Sources may include other corporate networks, such as Cisco, Netskope, and Juniper, as examples. A listing of known trusted sources is maintained in a metadata store. Sanctioned documents in this category are allowed access into the corporate network without further processing.

At any one time, multiple documents will remain restricted and classified as unknown or unsanctioned documents, meaning that the ownership has not been determined. These linked documents, which may be multiple documents at any one time, will be subject to the network security system policy-based rules to determine how they will be handled. In the case of the linked document where the ownership is successfully determined to be from a benign source, the document will be allowed into the corporate network. In cases where the identity cannot be determined, the linked document will be quarantined for further processing. Quarantined documents are isolated from entering the network. Quarantined documents may undergo threat scanning of the content of the document to determine whether the document includes malicious links to malicious sites. If it is determined that a document is free of malicious links, the document will be allowed access into the corporate network.

The ownership of the linked document will be logged into the system by GUID. The document and subsequent documents based on the same GUID will be allowed.

If a document includes malicious links, which redirect the user to a malicious website, the document will be blocked from entering the network. In one particular implementation, the blocked document will enter a sandbox for further analysis in a software environment which is fully isolated from the corporate network. In a further implementation, blocked documents may be classified as blacklisted documents along with their associated malicious websites. The metadata store will maintain a listing of these malicious websites, and any documents associated with a malicious website will be automatically blacklisted.

In another implementation, the method includes identifying ownership of a document as personal or corporate. In another implementation, accepted document files are further identified by CRC code and file size.

In some implementations, a network administrator can monitor documents being accessed on the corporate network. The network administrator can further monitor users accessing public documents originating from outside the corporate network, and still further, the network administrator has a control function for allowing or limiting document access within the corporate network.

In some cases, it is advantageous to limit the exchange of confidential information between departments in a corporate network. For example, corporate financial information is not generally shared across all corporate groups. Personnel information should be shared only when necessary for the users to perform their employment-related duties. Intellectual property and development information should be highly classified, along with customer lists and contacts. On the other hand, the exchange of certain confidential data should be accessible between certain designated departments in the corporate network. These are often individual decisions determined by corporate policy regarding the dissemination of information between divisions or product groups. Furthermore, it some cases, it will be advantageous for corporate users to share documents with a set of trusted outside instances. Still further, it will be advantageous to allow collaboration between a corporate group and trusted external users. The security administrator, in one implementation, predetermines whether document sharing will be allowed between certain groups or limited between certain groups.

This system implementation and other systems disclosed optionally include one or more of the following features. The claimed system can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes. Each of the features discussed in this particular implementation section for the system implementation apply equally to the method implementation. As indicated above, all the system features are not repeated here and should be considered repeated by reference.

In this system implementation, a system is provided for mitigating phishing attacks against the corporate network via sharing of linked document files from cloud-based applications accessible from the corporate network, wherein a link to a document file may include links to malicious content. In this implementation, a network security system comprises an evaluation engine, a network policy store, a threat scanner, and a sandbox. An inline proxy is in communication with the evaluation engine and a metadata store, for intercepting linked document files being shared or accessed by a cloud-based application accessible to the corporate network.

Each document from a continuing stream of documents is assessed to identify its source or ownership before being allowed into the corporate network. The inline proxy, in connection with the evaluation engine and metadata store, determine if a linked document file is coming from within the corporate network or from outside the corporate network. Documents coming from within the corporate network are allowed unrestricted access to the corporate network. Documents from outside the corporate network are subjected to policy-based rules to determine how they will be handled by the system.

In the first case, linked document files which originate from known trusted sources are allowed into the corporate network. Unknown documents are initially restricted while document ownership is first determined. In this instance, the danger of compromise to the corporate network always comes from unidentified, malicious linked documents, which are initially restricted while ownership can be determined. The inline proxy, evaluation engine, and metadata store determine, for at least a first document, that the linked document file is a sanctioned document from a trusted source. Sanctioned documents are allowed evaluation is into the corporate network.

The inline proxy, evaluation engine, and metadata store determine, for at least a second document that the linked document is an unknown or unsanctioned document not from a trusted source, identifies the ownership of the document, and applies a policy rule based on ownership to determine if the linked document will be allowed into the corporate network or quarantined.

The system includes a threat scanner for scanning the content of the linked document for malicious links. For at least one third document, the system determines that a linked document contains malicious links and is blocked and maybe sandboxed.

For at least one fourth document, the evaluation engine determines that the document does not contain malicious links. The GUID associated with the owner is logged and the document file is allowed access to the corporate network as well as subsequent files based on at least the same GUID.

The technology disclosed may also be used for mitigating other vectors of phishing attack such as data exfiltration, which is generally implemented through a DNS connection. In this phishing attack method, where untrusted external party shares a benign document with a corporate device insider. The insider may unknowingly edit the document by placing sensitive data within it, and instantly that data will be available to the untrusted external user.

What is claimed is:

1. A method for mitigating phishing attacks against a corporate network via sharing of linked document files from cloud-based applications accessible from the corporate network, wherein a linked document file may include links to malicious content, the method, applied repeatedly to multiple documents, comprising:

intercepting a linked document file, using an inline proxy, responsive to an Application Program Interface (API) access to accept sharing or to access the linked document via a cloud-based application accessible to the corporate network;

determining, for multiple documents, that the linked document is coming from outside the corporate network, and restricting the multiple documents that are coming from the outside, and further processing the restricted documents, including;

determining, for at least one first document, that the linked document is a sanctioned document from a trusted source and allowing the linked document into the corporate network;

determining, for at least a one second document, that the linked document is an unknown or unsanctioned document not from a trusted source, identifying the ownership of the document, and applying a policy rule based on ownership, which determines if the linked document will be allowed into the corporate network or quarantined, further including;

threat scanning the content of the linked document for malicious links;

for at least one third document, blocking the linked document that contains malicious links; and for at least one fourth document, accepting the linked document that does not contain malicious links, logging by the Globally Unique Identifier (GUID) the ownership of the accepted document file, and allowing the document file access to the corporate network and continued access based on at least the same GUID.

2. The method according to claim 1, wherein the quarantined document file is isolated is in a sandbox to inspect for malicious redirection code.

3. The method of claim 1, further determining the ownership of the document based on analyzing traffic metadata or by querying ownership over the network.

4. The method of claim 1, further determining whether the document file is personal or corporate.

5. The method of claim 1, further determining whether a document file originates from a blacklisted website or Uniform Resource Locator (URL).

6. The method of claim 5, wherein document files originating from a blacklisted website or URL are automatically blocked.

7. The method of claim 1, wherein the ownership of a document file is compared to a stored listing of previously sanctioned websites and will be automatically allowed if listed.

8. The method of claim 1, wherein accepted document files are further identified by Cyclic Redundancy Check (CRC) code and file size.

9. The method of claim 1 wherein a network administrator can monitor documents being accessed on the corporate network.

10. The method of claim 9 wherein the network administrator can monitor users accessing public documents originating from outside the corporate network.

11. The method of claim 9, wherein the network administrator can allow sharing of document files between predetermined corporate groups within the corporate network.

12. The method of claim 9, wherein the network administrator can restrict sharing of document files between predetermined corporate groups within the corporate network.

13. A system for mitigating phishing attacks against a corporate network via sharing of linked document files from cloud-based applications accessible from the corporate network, wherein a linked document file may include links to malicious content, the system comprising:

a network security system in operative communication with the corporate network, the security system comprising an evaluation engine, a network policy store, a threat scanner, and a sandbox;

an inline proxy in communication with the evaluation engine and a metadata store for intercepting the linked document file when it is being shared or accessed by a cloud-based application accessible to the corporate network;

the in-line proxy and the evaluation engine determining if the linked document file is coming from outside the corporate network and restricting document files coming from outside the corporate network, the system further processing the restricted documents, including;

the in-line proxy, evaluation engine, and metadata store determining, for at least one first document, that the linked document file is a sanctioned document from a trusted source and allowing the linked document into the corporate network;

the in-line proxy, evaluation engine, and metadata store determining, for at least a one second document, that the linked document is an unknown or unsanctioned document not from a trusted source, identifying the ownership of the document, and applying a policy rule based on ownership, which determines if the linked document will be allowed into the corporate network or quarantined, further including;

a threat scanner for scanning the content of the linked document for malicious links for at least one third document, blocking the linked document that contains malicious links; and for at least one fourth document, accepting the linked document that does not contain malicious links, the evaluation engine further logging by the Globally Unique Identifier (GUID) the ownership of the accepted document file; and allowing the document file access to the corporate network and continued access based on at least the same GUID.

14. The system of claim 13, wherein the system further determines whether a document file is personal or corporate.

15. The system of claim 13, wherein the threat scanner quarantines a document file which may contain malicious links, based on ownership data for the document file.

16. The system of claim 15 wherein a quarantined document file is further analyzed in a sandbox to determine if the document file contains malicious redirection code.

17. The system of claim 13, wherein the metadata store maintains a database listing of blacklisted websites and Uniform Resource Locator (URLs) that are automatically blocked.

18. The system of claim 13, wherein the metadata store maintains a database listing of previously sanctioned websites and URLs that are automatically allowed.

19. The system of claim 13, further including a network administrator who can monitor documents files being accessed on the corporate network.

20. The system of claim 19, wherein the network administrator can monitor public document files being accessed on the corporate network.

21. The system of claim 19, wherein the network administrator can allow sharing of document files between predetermined corporate groups on the corporate network.

22. The system of claim 19, wherein the network administrator can restrict sharing of document files between predetermined corporate groups on the corporate network.

23. The system of claim 19, wherein the network administrator can allow sharing of document files between corporate users and trusted outside instances.

24. The system of claim 19, wherein the network administrator can allow between a corporate group and trusted external users.

25. The system of claim 13, wherein ownership of an unknown document file is determined by analyzing traffic metadata or by querying ownership over the network.

26. The system of claim 13 for mitigating phishing attacks against a corporate network via sharing of linked document files from cloud-based applications accessible from the corporate network, the evaluation engine further detecting an instance of data exfiltration introduced through the Domain Name System (DNS) server connection.

* * * * *

UNITED STATES PATENT AND TRADEMARK OFFICE
CERTIFICATE OF CORRECTION

PATENT NO. : 11,082,445 B1  
APPLICATION NO. : 17/154978  
DATED : August 3, 2021  
INVENTOR(S) : Venkataswamy Pathapati et al.

Page 1 of 1

It is certified that error appears in the above-identified patent and that said Letters Patent is hereby corrected as shown below:

In the Claims

Column 14, Line 23, delete "the Globally Unique Identifier" and insert -- a Globally Unique Identifier --.

Column 15, Lines 32-33, delete "the Globally Unique Identifier" and insert -- a Globally Unique Identifier --.

Signed and Sealed this
Twentieth Day of May, 2025

Coke Morgan Stewart
*Acting Director of the United States Patent and Trademark Office*